United States Patent [19]
Kowis

[11] Patent Number: 5,179,784
[45] Date of Patent: Jan. 19, 1993

[54] WHEEL ALIGNMENT DEVICE

[76] Inventor: Fred Kowis, 2411 Mary St., Alvin, Tex. 77511

[21] Appl. No.: 833,136

[22] Filed: Feb. 10, 1992

[51] Int. Cl.$^5$ .............................................. G01B 11/275
[52] U.S. Cl. ................................... 33/203.18; 33/336
[58] Field of Search ................. 33/286, 288, 203.18, 33/203.19, 203.2, 608, 336, 337, 335

[56] References Cited

U.S. PATENT DOCUMENTS

| | | | |
|---|---|---|---|
| 1,971,702 | 8/1934 | Burgan | 33/336 |
| 2,627,123 | 2/1953 | Taber | 33/372 X |
| 4,337,581 | 7/1982 | Eck | 33/288 |

FOREIGN PATENT DOCUMENTS 612699 11/1948 United Kingdom ............ 33/203.18

Primary Examiner—Harry N. Haroian

[57] ABSTRACT

A wheel alignment device having a frame, a plurality of abutment members fastened to the frame and extending outwardly therefrom, a bubble level fastened to the frame so as to provide an indication of inclination of the frame relative to vertical, and an indicator interactive with the bubble level for producing a humanly perceivable display of a degree of inclination. Each of the abutment members has an end opposite the frame which is coplanar with the ends of the other abutment members. These ends are arranged so as to be parallel relationship to the frame. An insert member is slidably received by the frame and has a first transverse surface at one end and a second transverse surface at another end. A bungie cord is connected to the frame and extends outwardly therefrom for flexibly attaching the frame to a wheel.

15 Claims, 3 Drawing Sheets

WHEEL ALIGNMENT DEVICE

TECHNICAL FIELD

The present invention relates to devices for the measurement of wheel alignment. More particularly, the present invention relates to devices that are portable and can be used for the measure of wheel caster, camber and toe-in.

BACKGROUND ART

Various devices, apparatus and systems have been used and are known in the prior art for determining the camber and caster of vehicle wheels. Caster is the backward tilt of the axle or the member holding the wheel and camber is the outward tilt of the top of the wheel. Caster and camber are utilized in order to provide for ease of steerage of the vehicle and produce a minimal amount of wear on the vehicle tires. The various systems and apparatus known in the prior art have generally been quite complicated, difficult to use, and generally expensive. Furthermore, the previously known devices were of questionable reliability except for the most expensive and sophisticated systems.

Within recent years, increased emphasis has been placed upon the desirability of aligning large wheels, such as those found upon buses and trucks. Vehicles of this type are usually aligned by driving the vehicles onto wheel turntables located on the runways of pit, power and drive-on racks. The use of racks enables the alignment operator to make the necessary adjustment without undue bending. Additionally, improved access is provided to the underside of the vehicle to enable the necessary alignment corrections to be made. However, such racks are also complicated to use, can be dangerous, and are somewhat unreliable.

In the past, a large number of patents have dealt with devices that have been used for the alignment of wheels. U.S. Pat. No. 2,137,485, issued on Nov. 22, 1938, to Greenleaf et al. discloses a wheel alignment device which is attached directly to the side of wheel while it is in place on its axle. An indicator is provided so as to indicate normal caster, camber, turning radius or toe-in positions. U.S. Pat. No. 2,608,368, issued on Aug. 26, 1952, to Bagge et al. shows a wheel gage mounting device for determining the camber and caster of front wheels of vehicles. The device is mounted on the wheel spindle. U.S. Pat. No. 3,079,695, issued on Mar. 5, 1963, to Mineck discloses a wheel alignment device in which the wheels are supported on flat tables supported on casters. A vertical extension extends upwardly from the tables so as to measure caster and camber. U.S. Pat. No. 3,488,857, issued on Mar. 13, 1970, to J. R. Bateman provides a wheel alignment apparatus having support legs with interchangable adapters for connection to either spindles of the steerable wheels of an automotive vehicle or to the drums that ordinarily mount the wheel. U.S. Pat. No. 4,271,599, issued on Jun. 9, 1981, to F. C. Pavitt discloses an apparatus for use in measuring the camber and caster of a motor vehicle wheel. This apparatus comprises two slidably adjustable parallel rods which engage either the rim of the vehicle wheel or the suspension members. A spirit level is used to measure the inclination of the rods relative to the horizontal for determining the caster or camber of the wheel. U.S. Pat. No. 3,292,268, issued on Dec. 20, 1966, to H. L. Knight discloses an automobile front wheel alignment mechanism having a frame for mounting on the outer side wall of the front wheel tires of an automotive vehicle. A pendulum means is suspended from an upper portion of the fixed frame and has an elongated bottom member arranged for metering cooperation with the scale means. U.S. Pat. No. 3,443,318, issued on May 13, 1969, to C. W. MacMillan shows an apparatus for electrically measuring the toe of vehicle wheels having a pair of toe arms suspended from the front wheel of the vehicle and carrying a pendulum which is movable about a vertical axis. An electromagnet is associated with the pendulum for producing a current which is representative of the angular position of the pendulum and, thus, a measure of the toe of the vehicle wheel. U.S. Pat. No. 3,648,375, issued on Mar. 14, 1972, to E. D. Wilkerson provides a support for a portable wheel aligner unit to carry adjustably the aligner unit from a storage position to a position adjacent the vehicle wheel to be aligned. U.S. Pat. No. 4,569,140, issued on Feb. 11, 1986, to J. A. Hobson discloses a thrust line wheel alignment apparatus and method which relies upon a stationary reference "halo" so as to measure vehicle wheel alignment.

It is an object of the present invention to provide a portable wheel aligner device which is suitable for the measure of caster, camber, and toe-in of a vehicle wheel.

It is another object of the present invention to provide a portable wheel alignment measuring device which is easy to use, simple to manufacture, and relatively inexpensive.

It is another object of the present invention to provide a device for the measuring of wheel alignment which is adaptable to various sizes of vehicle wheels.

These and other objects and advantages of the present invention will become apparent from a reading of the attached specification and appended claims.

SUMMARY OF THE INVENTION

The present invention is a device for the measurement of wheel alignment which comprises a frame, a plurality of abutment members fastened to the frame and extending transversely outwardly therefrom, a bubble level fastened to the frame so as to provide an indication of the inclination of the frame relative to vertical, and an indicator device so as to provide a positive indication of the degree of inclination. The abutment members have an end opposite to the frame which is parallel to the frame. Each of the ends are coplanar with each other.

The frame has a generally flat configuration. The frame is comprised of square steel tubing. This square steel tubing has a horizontal member extending transverse to the abutment members. An insert member extends into the horizontal member of the frame and is linearly aligned with this horizontal member. The insert member is adjustable relative to the frame. The insert member has a first transverse surface extending outwardly from an end of the insert member and a second transverse surface extending from the horizontal member in generally parallel relationship with the first transverse surface. The insert member is adjustable so as to vary the distance between the first and second transverse (vertical) surfaces.

The abutment members comprise three abutment members which are arranged in a triangular configuration. The ends of the abutment members are generally two inches or more from the frame. The indicator includes a bubble level gage which is pivotally connected to the frame in proximity to the bubble level. The indicator includes a marker fastened thereto which is movable so as to provide a manual indication of angular displacement of the bubble level.

Importantly, a bungie cord is connected to the frame and extends outwardly from the frame. The bungie cord allows the frame to be removably attached to the exterior of a wheel. The bungie cord will allow the frame to be juxtaposed to the wheel during the time of alignment measurement.

DETAILED DESCRIPTION OF THE INVENTION

Figure 1:
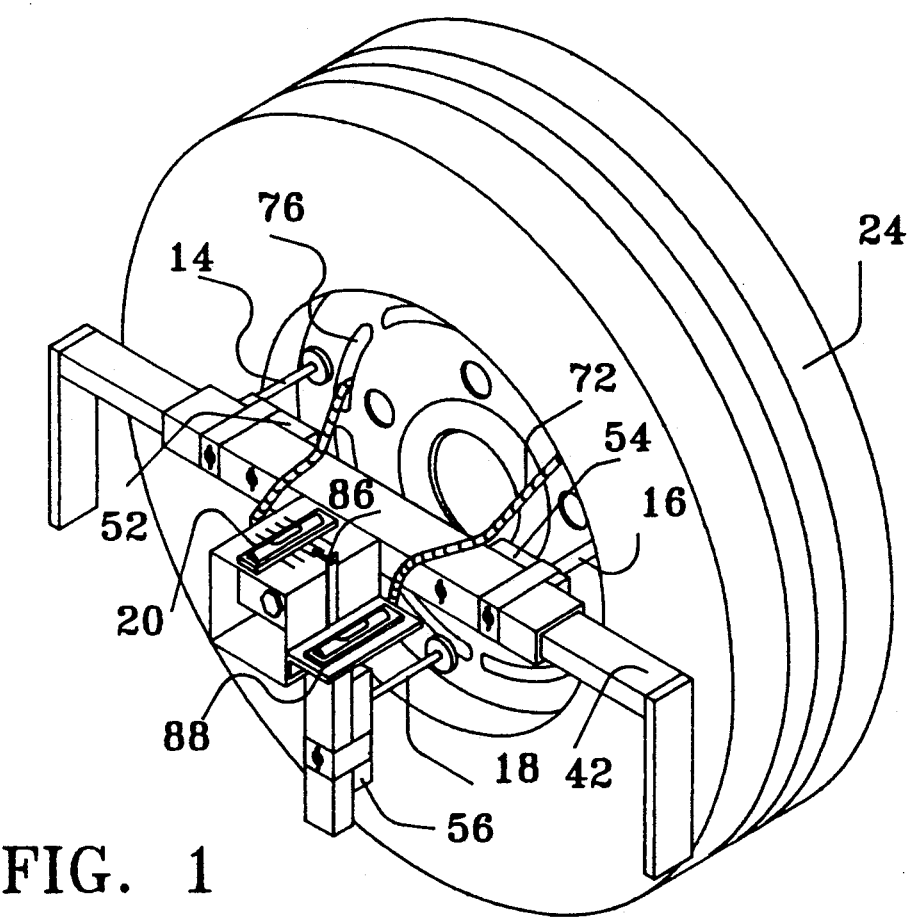
FIG. 1 illustrates a perspective view of the wheel alignment device of the present invention as attached in proper position relative to a wheel.

Referring to FIG. 1, there is shown at 10 the wheel alignment device in accordance with the preferred embodiment of the present invention. The wheel alignment device 10 comprises a frame 12, a plurality of abutment members 14, 16, and 18, a bubble level 20, and an indicator 22.

Initially, it can be seen that the frame 12 has a generally flat configuration relative to wheel 24. The frame 12 comprises a first horizontal member 26 which extends across a portion of the outer surface 28 of wheel 24. This horizontal member 26 is made of a generally square steel tubing. It can be seen that the horizontal member 26 extends generally transverse to the abutment members 14, 16, and 18. The frame 12 also includes a vertical member SO which bisects the horizontal member 26. The vertical portion 30 of the frame 12 extends downwardly from the horizontal member 26 across another portion of the wheel 24. It can be seen that the abutment member 18 extends outwardly transverse relative to this vertical portion 30 of frame 12. Vertical portion 30 is fastened to housing 32 and is affixed to the horizontal member 26. Housing 32 is affixed to the horizontal member 26 and extends generally outwardly therefrom on the opposite side of the frame 12 from the wheel 24. Housing 32 supports bubble level 20 on the top surface thereof. It can also be seen that the housing 32 also includes the indicator 22 pivotally attached to the exterior surface thereof.

The horizontal member 26 of frame 12 is generally a hollow open section of square steel tubing. An insert member 34 extends into the horizontal member 26 of the frame 12. As can be seen, the insert member 34 is also a square steel tubular member which is slidably received within the interior of the horizontal member 26. The insert member 34 is linearly aligned with the horizontal member 26 and is adjustable relative thereto. A wingnut 36 is provided on the horizontal member 26 so as to engage an exterior surface of the insert member 34 for affixing the insert member 34 in a proper position relative to the horizontal member 26. Insert member 34 has a first transverse surface 38 extending outwardly from an end of the insert member 34. A bolt or wingnut 40 is provided at the end of insert member 34 so as to affix the vertical surface 38 in its proper position. Vertical surface SB may be a flat steel bar. The vertical surface 38 is positioned so as to allow toe-in to be measured.

It can be further seen that a second insert member 42 is provided at the opposite end of horizontal member 26. The second insert member 42 is also slidably received by the horizontal member 26. Wingnut 44 is provided so as to affix the second insert member 42 in a proper position relative to the horizontal member 26. A second transverse bar 46 is affixed to the end of the second insert member 42 and extends vertically downwardly therefrom. During the measurement of toe-in of a vehicle, the vertical surfaces 38 and 46 should be placed in parallel relationship to each other. The insert members 34 and 42 are adjustable for the purpose of adapting the wheel alignment device 10 to a wide variety of wheel sizes. In order to measure the toe-in of a vehicle, each of the front wheels of a vehicle should have the wheel alignment device 10 attached thereto. A suitable tape measure, or other device, should extend between the edges represented by vertical surfaces 38 and 46 so as to determine whether the distances between the opposite sides of the front wheels are in alignment. The vertical surfaces 38 and 46 provide a convenient surface upon which to carry out such a measurement. Suitable clips, or other mechanisms, can also be provided on the vertical surfaces 38 and 46 so as to enhance the ability of the present invention to measure toe-in.

The abutment members 14, 16, and 18 extend inwardly from frame 12 so as to engage portions of the rim 50 of wheel 24. Each of the abutment members 14, 16, and 18 is fastened at one end to adjustable bars 52, 54, and 56, respectively. A bracket 58 extends around the horizontal member 26 and the adjustment bar 52 so as to allow for proper adjustment of the abutment member 14 with respect to various wheel sizes. A wingnut 60 is provided so as to allow the adjustment bar 52 to be properly affixed in position relative to the horizontal member 26 of frame 12. Abutment member 14 extends toward the rim 50 from the adjustment bar 52 and has an end surface 62 which rests in flat abutment with rim 50. The second abutment member 16 is fastened to adjustment bar 54. A bracket 64 extends around the exterior of adjustment bar 54 and horizontal member 26 so as to allow the adjustment bar 54 to be moved along the exterior surface of horizontal member 26 for the accommodation of various sizes of rims 50. The abutment member 16 includes an end surface 66 which rests in flat abutment against the rim 50. Similarly, the third abutment member 18 is fastened to adjustment bar 56. Adjustment bar 56 is slidably positioned along the inner exterior surface of vertical portion 30 of frame 12. A bracket 68 fastened around the exterior of the adjustment bar 56 and the vertical portion 30 so as to allow the abutment member 18 to be adjusted to the various sizes of rims 50. The end surface 70 of abutment member 18 rests in flat abutment with the rim 50.

As can be seen, the abutment members 14, 16, and 18 are arranged in a generally triangular configuration. This enables the present invention to always be stabilized against a surface of the wheel 24. So as to stabilize the wheel alignment device 10, a bungie cord 72 engages openings 74 and 76 of the rim 50. The bungie cord 72 is a flexible cord of elastic which can be sized so as to properly restrain the wheel alignment device 10 in the position illustrated in FIG. 1. The use of the bungie cord 72 eliminates the requirement of complex mechanisms for fastening the wheel alignment device to the wheel 24. The bungie cord can be wrapped around the exterior of frame 12 so as to secure the frame to the wheel. After the frame 12 is secured to wheel 24, the various measurements of caster, camber, and toe-in can be made. After the measurements are completed, the bungie cord 72 can be easily removed by disengaging the end hooks from the openings 74 and 76 of rim 50.

In FIG. 1, it can be seen that the bubble level 20 is fastened to the top surface 80 of housing 32. Graduations 82 are provided along the upper surface of housing 32 so as to be indicative of the degree of inclination of the frame 12 relative to the wheel 24. Importantly, an indicator 22 is pivotally connected at 84 to the exterior of housing 32. A needle 86 is fastened to the end of indicator 22 and is placed in proximity to the graduations 82 of the bubble level 20. A second bubble level 88 is fastened to the indicator 22. When it is necessary to make a proper measurement of the alignment of the wheel, the pointer 86 can be moved relative to the graduations 82 until the bubble on the second bubble level 88 is properly centered between its markings. The location of the pointer 86 relative to the graduations 82 will be indicative of the degree of inclination of the wheel 24 and the frame 12.

Figure 2:
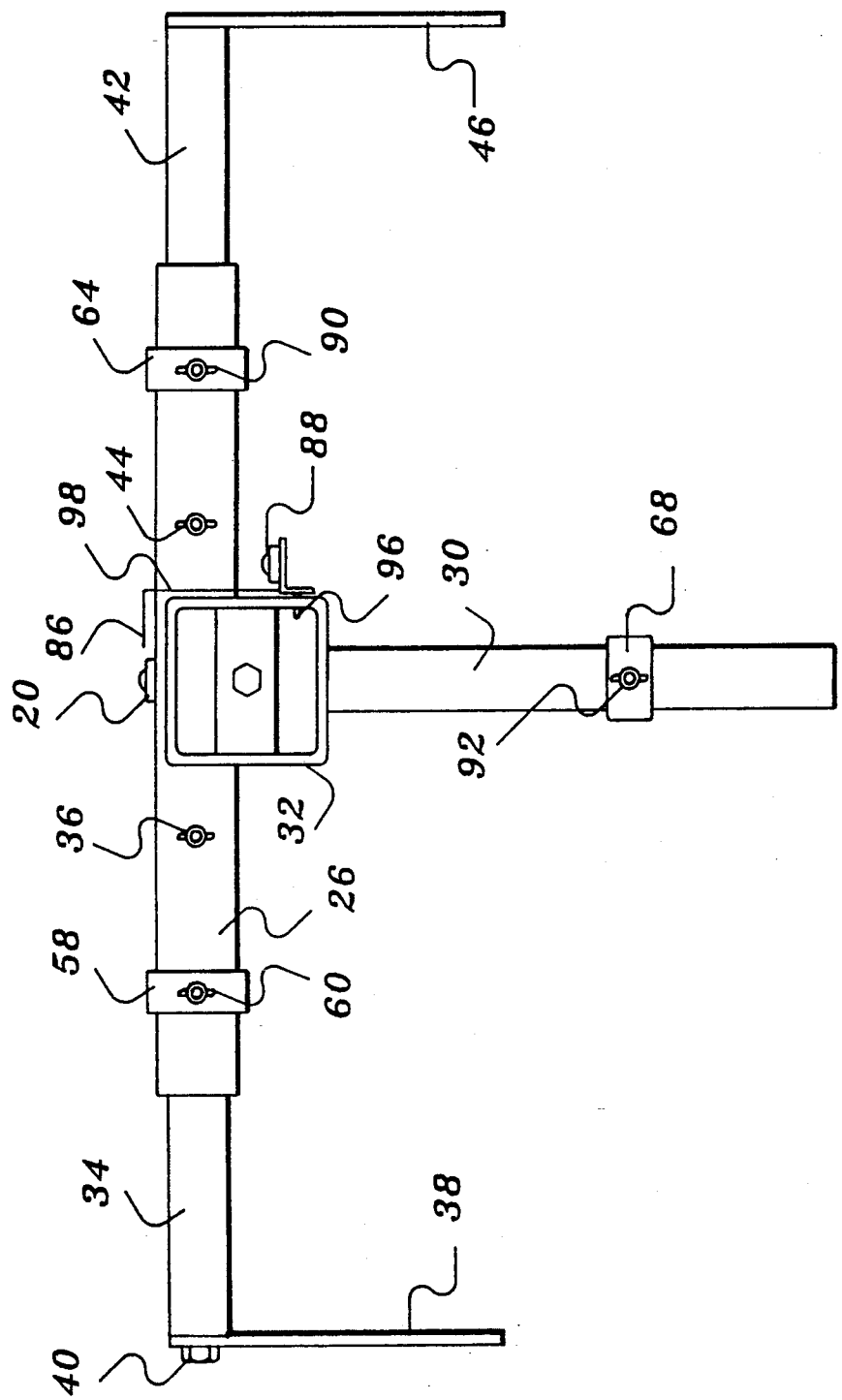
FIG. 2 is a side elevational view of the wheel alignment device of the present invention.

FIG. 2 is a further illustration of the wheel alignment device 10 of the present invention. In FIG. 2, it can be seen that the wheel alignment device 10 has a generally T-shaped configuration. The horizontal member 26 receives the first insert member 34 in one end and the second insert member 42 in another end. The first vertical surface 38 is fastened by bolt 40 to one end of insert member 34. Bolt 40 is provided so as to allow the vertical surface 38 to be properly adjusted. The second vertical surface 46 may be permanently mounted to the end of the insert member 42 or may be attached by bolting or other means. It can be seen that the first vertical surface 38 is in parallel relationship to the second vertical surface 46. In this position, the vertical surfaces 38 and 46 are in a proper position for measuring toe-in of a wheel. Wingnuts 36 and 44 are provided so as to allow for the proper adjustment of the insert members 34 and 42 relative to wheel size. By loosening the wingnuts 36 and 44, the insert members 34 and 42 can be completely removed for storage.

In FIG. 2, it can also be seen that brackets 58 and 64 slide along the exterior surface of horizontal member 26. As was stated previously, the movement of the brackets 58 and 64 is suitable for adjusting the abutment members 14 and 16 relative to the size of the wheel rim 50. A wingnut 60 is placed on bracket 58 so as to allow for ease of adjustment. Similarly, wingnut 90 is provided on the bracket 64 so as to allow for the easy adjustment of the abutment member 16. With complete loosening, the brackets 58 and 64, and the associated abutment members 14 and 16, respectively, can be removed for storage.

In FIG. 2, it can be seen that housing 32 is a generally square shaped housing which extends outwardly from a surface of the horizontal member 26. Housing 32 may be welded, bolted, or otherwise attached to the horizontal member 26. The vertical portion 30 extends downwardly from housing 32. The bracket 68 slides along the surface of vertical portion 38. As was stated previously, the bracket 68 allows for the proper adjustment of the third abutment member 18 for the various sizes of rim 50. A wingnut 92 is provided on the bracket 68 so as to enhance the ease of adjustment.

In FIG. 2, the bubble level 20 is particularly illustrated. The bubble level 20 is affixed to the top surface 94 of the housing 32. The bubble level 20 is directly indicative of the inclination of the frame 12 with respect to the vertical. In order to obtain an accurate measurement of the degree of inclination, a second bubble level 88 is provided so as to be pivotally mounted at 96 to the exterior surface of housing 32. An arm 98 having a pointer 86 extends upwardly from the second bubble level 88. The pointer 86 is adjacent to the graduations 82, as illustrated in FIG. 1. The manual manipulation of the arm 98 allows for the degree of inclination of the frame 12 to be properly determined. This is indicative of the caster and the camber of the wheel 24.

Figure 3:
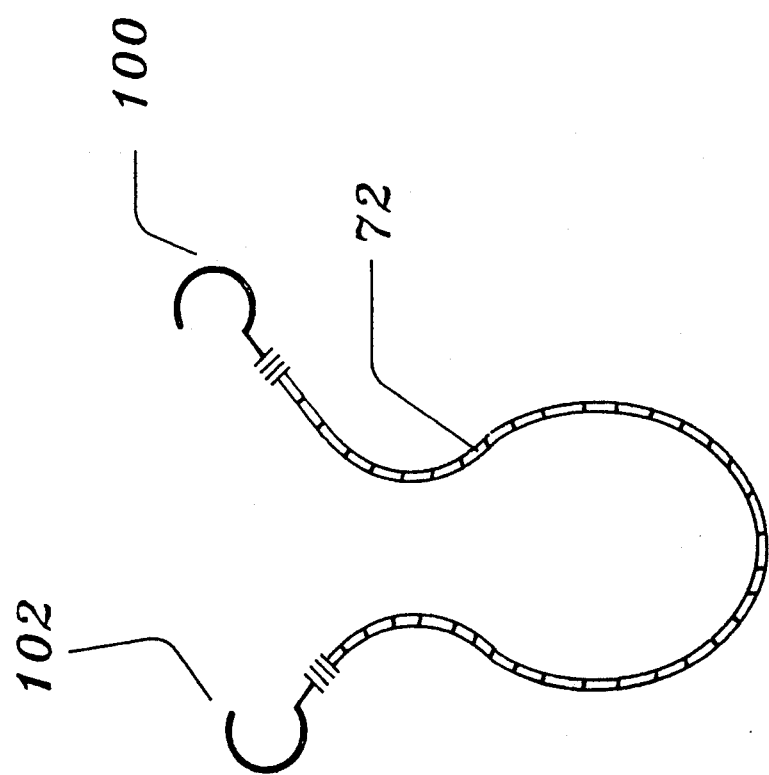
FIG. 3 is an isolated detail view of the bungie cord as used in connection with the present invention.

In FIG. 3, it can be seen that the bungie cord 72 has a first hook 100 at one end and a second hook 102 at the other end. The hooks 100 and 102 are suitable for engaging portions of the wheel 24 or the rim 50. The bungie cord 72 can wrap around any portion of the exterior of frame 12 so as to draw the frame 12 in abutment with the exterior surface of the wheel 24.

The present invention is an improvement over prior wheel alignment devices. Conventionally, wheel alignment devices have been very expensive and have required complex manipulation so as to determine whether the wheels are properly aligned. In order to carry out a measurement with the present invention, on the other hand, it is only necessary to place the abutment members 14, 16, and 18 into abutment with the rim 50. The bubble levels 20 and 88 will provide an indication of whether the wheel is properly aligned. Measurements taken across the vertical surfaces 38 and 46 between each of the front and/or rear wheels are indicative of the toe-in of the device. The present invention can be easily disassembled, assembled, and adapted to various sizes of wheels.

The use of the bungie cord of the present invention allows the device 10 to be easily affixed to the exterior of the wheel. There is no need to remove hubs, nuts, or to bring any either attachment device into play. The bungie cord 72 can be easily attached and easily removed from virtually any available wheel. In this manner, the present invention is adaptable to a wide variety of wheel types.

The foregoing disclosure and description of the invention is explanatory and illustrative thereof. Various changes in the details of the illustrated construction may be made within the scope of the appended claims without departing from the true spirit of the invention. The present invention should only be limited by the following claims and their legal equivalents.

I claim:
1. A wheel alignment device comprising:
a frame;
a plurality of abutment members fastened to said frame and extending outwardly therefrom, each of said abutment members having an end opposite said frame which is coplanar with an end of another of said abutment members;
a first bubble level gage affixed to said frame, said first bubble level gage for providing an indication of an inclination of said frame relative to vertical; and
indicator means interactive with said bubble level means, said indicator means for producing a humanly perceivable display of a degree of inclination, said indicator means comprising a second bubble level gage pivotally connected to said frame in proximity to said first bubble level gage, said second bubble level gage having a marker connected thereto, said second bubble level gage and said marker movable so as to provide an indication of angular displacement of said first bubble level gage.

2. The device of claim 1, said frame having a generally flat configuration.

3. The device of claim 2, said frame comprised of square steel tubing, said square steel tubing having a horizontal member extending transverse to said abutment members.

4. The device of claim 3, further comprising:
an insert member extending into said horizontal member of said frame, said insert member linearly aligned with said horizontal member, said insert member adjustable relative to said frame.

5. The device of claim 4, said insert member having a first transverse surface extending downwardly from an end of said insert member.

6. The device of claim 5, further comprising:
a second transverse surface extending from said horizontal bar in parallel relationship with said first transverse surface, said insert member adjustable so as to vary a distance between said first and second transverse surfaces 7. The device of claim 1, said plurality of abutment members comprising three abutment members arranged in a triangular configuration, the ends of said abutment members positioned greater than two inches from said frame.

8. A device for measuring wheel alignment device comprising:
a frame;
a first abutment member, a second abutment member, and a third abutment member extending outwardly transverse to said frame, each of said abutment members having a coplanar end surface opposite said frame, said end surface being generally parallel to said frame, said frame having a horizontal member extending transverse to said abutment members;
bubble level means connected to said frame, said bubble level means for providing an indication of an inclination of said frame relative to vertical; and
an insert member extending into said horizontal member of said frame, said insert member linearly aligned with said horizontal member, said insert member adjustable relative to said frame.

9. The device of claim 8, said insert member having a first transverse surface extending outwardly from an end of said insert member and a second transverse surface extending from said horizontal member in parallel relationship with said first transverse surface, said insert member adjustable so as to vary a distance between said first and second transverse surfaces.

10. The device of claim 8, said first abutment member, said second abutment member, and said third abutment member arranged in a triangular configuration, said end surfaces positioned at least two inches from said frame.

11. The device of claim 8, further comprising:
indicator means interactive with said bubble level means, said indicator means for producing a humanly perceivable display of a degree of inclination of said frame.

12. The device of claim 8, further comprising:
a bungie cord connected to said frame and extending outwardly therefrom, said bungie cord for flexibly attaching said frame to a surface of a wheel.

13. A device for measuring wheel alignment and toe-in comprising:
a frame having a generally adjustable extensible horizontal member connected thereto, said horizontal member having a first vertical surface attached at one end, said horizontal member having a second vertical surface attached to an opposite end, said first and second vertical surfaces arranged in parallel relationship to each other;
a plurality of abutment members fastened to said frame and extending outwardly therefrom, each of said abutment members having an end in parallel relationship to said frame, the ends of said abutment members being each of equal distance from said frame; and
bubble level indicator means connected to said frame, said bubble level indicator means for providing an indication of inclination of said frame relative to vertical.

14. The device of claim 13, said frame comprised of square steel tubing, said extensible horizontal member comprised of square steel tubing, said extensible horizontal member slidably received by said frame.

15. The device of claim 13, said plurality of abutment members comprising three abutment members arranged in a triangular configuration, the ends of said abutment members positioned greater than two inches from said frame, each of said abutment members adjustable along said frame.

* * * * *